(12) United States Patent
Inamura et al.

(10) Patent No.: US 6,986,516 B2
(45) Date of Patent: Jan. 17, 2006

(54) METAL GASKET WITH PARTIAL COATING

(75) Inventors: Susumu Inamura, Utsunomiya (JP); Shinichi Sato, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/267,738

(22) Filed: Oct. 10, 2002

(65) Prior Publication Data

US 2003/0075874 A1    Apr. 24, 2003

(30) Foreign Application Priority Data

Oct. 23, 2001 (JP) ............................. 2001-325063

(51) Int. Cl.
*F02F 11/00* (2006.01)
(52) U.S. Cl. ...................................... 277/592; 277/594
(58) Field of Classification Search ................ 277/592, 277/594, 596
See application file for complete search history.

(56) References Cited

U.S. PATENT DOCUMENTS

| | | | |
|---|---|---|---|
| 3,930,656 A | | 1/1976 | Jelinek |
| 4,830,698 A | * | 5/1989 | DeCore et al. ............. 156/219 |
| 5,197,747 A | * | 3/1993 | Ueta et al. ................... 277/595 |
| 5,280,928 A | * | 1/1994 | Ueta et al. ................... 277/595 |
| 5,582,415 A | * | 12/1996 | Yoshida et al. ............. 277/592 |
| 5,695,203 A | * | 12/1997 | Udagawa .................... 277/595 |
| 5,769,430 A | * | 6/1998 | Udagawa .................... 277/592 |
| 6,105,971 A | * | 8/2000 | Hasegawa ................... 277/593 |
| 6,145,847 A | * | 11/2000 | Maeda et al. ............... 277/593 |
| 6,343,795 B1 | * | 2/2002 | Zerfass et al. .............. 277/593 |
| 6,349,945 B1 | * | 2/2002 | Schmucker et al. ........ 277/592 |
| 6,517,085 B2 | * | 2/2003 | Udagawa et al. ........... 277/592 |
| 6,550,782 B2 | * | 4/2003 | Okazaki et al. ............. 277/592 |
| 6,585,272 B2 | * | 7/2003 | Inamura et al. ............. 277/592 |
| 6,619,665 B2 | * | 9/2003 | Miyaoh et al. .............. 277/592 |

FOREIGN PATENT DOCUMENTS

| | | |
|---|---|---|
| DE | 198 29 058 | 1/2000 |
| EP | 1 079 155 | 2/2001 |
| JP | 9-68281 | * 3/1997 |

* cited by examiner

*Primary Examiner*—Alison K. Pickard
(74) *Attorney, Agent, or Firm*—Manabu Kanesaka

(57) ABSTRACT

A metal gasket is formed of a metal base plate for sealing between two members. The metal gasket has a bead around a cylinder bore and a bead around a fluid hole on the metal base plate. Coatings are applied on both surfaces of the beads, respectively. When the metal gasket is tightened, strong sealing surface pressures are locally generated at sealing line portions of the beads. The coatings are applied only on other portions except for the sealing line portions.

2 Claims, 4 Drawing Sheets

METAL GASKET WITH PARTIAL COATING

BACKGROUND OF THE INVENTION AND RELATED ART STATEMENT

The invention relates to a metal gasket installed between two members, such as a cylinder head and a cylinder block, of an internal combustion engine to seal therebetween. More specifically, the invention relates to a metal gasket formed of a single metal base plate or a plurality of metal base plates, coated with a coating.

When joint surfaces between a cylinder head and a cylinder block (cylinder body) of an engine of an automobile is sealed, a cylinder head gasket is installed therebetween to seal a combustion gas, cooling water and the like.

In view of demand for a light weight and low cost of the engine, a structure of the cylinder head gasket has been shifted to a simple type formed of a single or two metal base plates from a laminated type having a number of metal plates. Due to a few constituent plates, only limited types of materials can be used.

In the laminated type metal plate gasket, sealing devices, such as a bead, grommet and shim, can be combined as desired or provided in double for effective sealing. However, in the single or two plate gasket, a type and a number of sealing devices are limited, so that a simplified sealing device has to be used. Further, the area available for the sealing device is limited with reduction of an engine size.

As shown in FIG. 5, the cylinder head gasket is formed to have a shape of an engine member, such as a cylinder block. The cylinder head gasket includes holes 2 for cylinder bores (hereinafter referred to simply as "cylinder bore 2"); fluid holes 3, 4 for circulating the cooling water and engine oil (hereinafter referred to simply as "fluid holes 3, 4"); and bolt holes 5 for tightening bolts, and the like. Also, the sealing devices, such as beads 12, 13, with respect to the respective holes 2, 3 to be sealed, are provided.

In case a gasket is sealed between the engine members, the sealing properties of the gasket required by the respective holes are greatly different. At the cylinder bore 2, it is required to seal the combustion gas with a high temperature and a high pressure, while at the fluid hole 3, it is required to seal a fluid with a relatively low temperature and pressure.

The cylinder bore 2 is provided with a bead 12 with an arc shape and a narrow width, which is made of a material with elasticity to fit the uneven surface. The cylinder bore 2 is also surrounded by a plurality of bolt holes 5, and bolts are inserted therein and tightened to apply a large surface pressure around the cylinder bore 2.

On the other hand, the fluid hole 3 is provided with the bead 13 to seal therearound. Depending on a structure of the engine, the fluid hole 3 may be positioned outside the area surrounded by the bolt holes 5. In this case, a pressing force of the tightening bolt is applied to only one side of the fluid hole 3, so that the surface pressure becomes small. To solve the problem, a higher bead, a narrower bead, or a pointed bead may be used.

Further, to improve the fitting property between the bead and the metal surface abutting against the gasket, a coating has been used.

For example, in a gasket disclosed in Japanese Utility Model Publication (JITSUKAIHEI) No. 2-16861, a bead in a belt shape is locally provided and, at the same time, an elastic coating film is provided on both surfaces of the metal base plate. In this case, the thickness of the elastic coating film provided on the bead projection side is made thicker than that on the other side. Thus, a strong tightening pressure applied to the top portion of the bead is absorbed by the thick elastic coating film to thereby keep the same tightening surface pressure as that on the other side. Thus, good surface pressure balance can be maintained, and a high torque and durability can be obtained.

However, in the gasket, since a large sealing surface pressure is applied to the top portion of the bead, when the gasket is used for a long time, the elastic coating film covering the bead top portion causes a flow or wear-out. Thus, the sealing surface pressure is substantially reduced to cause the torque reduction.

Also, in a gasket disclosed in Japanese Utility Model Registration No. 2605613, a rubber-like elastic material is coated on both surfaces of a supply member with a bead formed of a metal plate. In the gasket, a rubber hardness of the coating applied to the bead projection side is set higher than that on the other side to suppress the flow of the coating at the top portion of the bead. To set the rubber hardness on the other side lower, a surface pressure per unit area is held at a low value to thereby balance the sealing properties on both surfaces.

In the gasket, the sealing surface pressure is lowered, as a whole, by the coating with the lower rubber hardness applied on the other side. However, the sealing surface pressure on the bead top portion becomes partially extremely high when compared with that of the periphery of the bead by the coating with the high rubber hardness applied on the bead top side. Thus, there has been such a problem that the surface pressure applied to the coating on the bead top portion becomes high, and the flow and torque reduction, which results in a substantial lowering of the surface pressure, can not be prevented.

Further, a metal gasket disclosed in Japanese Patent Publication (TOKKAIHEI) No. 10-103523 includes a first coating layer provided on a bead projection side of a metal plate except for a bead projection portion, and a second coating layer provided on the other side of the metal plate. Since the first coating layer is not applied on the bead projection portion, the flow and the wear-out by repetition of the thermal expansion and contraction of the first coating layer do not occur at the bead top portion to thereby prevent the torque reduction, or reduction of the sealing surface pressure at the bead portion with passage of time.

However, since the second coating layer is applied to the overall surface on the side opposite to the bead projection side, the flow and wear-out of the second coating layer take place at the foot portions of the bead, where the second large sealing surface pressure next to that of the top portion of the bead is generated. Thus, a torque reduction takes place at these portions.

In view of the above problems, the present invention has been made. An object of the invention is to provide a metal gasket having good sealing property and durability, wherein when joint surfaces between a cylinder head and a cylinder block of an engine is sealed by a metal gasket formed of a single or a plurality of metal base plates, the flow and wear-out of the coating provided around the bead are not caused to thereby prevent the torque reduction.

Further objects and advantages of the invention will be apparent from the following description of the invention.

SUMMARY OF THE INVENTION

A metal gasket of the present invention for attaining the above objects is structured as follows:

1) In a metal gasket formed of a single metal base plate, wherein a bead is provided around a hole to be sealed of the metal base plate and coatings are applied to both surfaces of the bead to seal between two members, the coatings are applied to portions except for sealing lines where strong sealing surface pressures are locally generated when the metal gasket is tightened.

More specifically, the coatings are not applied to the portions where the sealing surface pressures are locally increased to form sealing lines when the metal gasket is tightened. In other words, in a full bead, the portions where no coating is applied are the top portion and foot portions, and in a half bead, the portions are shoulder portions.

2) In a metal gasket formed of a plurality of metal base plates, wherein a bead is provided around a hole to be sealed in at least one of the metal base plates and coatings are applied to both surfaces of the bead to seal between two members, the coatings are applied to portions except for seal line portions where the strong sealing surface pressures are locally generated.

3) In the above metal gaskets, the coating to be applied to a concave portion of the bead is made thicker than the other portions.

4) Regarding the coating, the thickness of the coating at the concave portion of the bead is formed in a range of 1.1–3.0 times greater that of the other portions.

5) In the above metal gasket, as the coating, although a rubber-type coating material, such as NBR rubber, fluoro-rubber and silicone rubber, can be used, it is preferable that the coating is formed of one or a combination of some among an epoxy resin, a phenol resin, a phenoxy resin, a fluororesin, a polyamide resin and polyamide imide.

In other words, it is preferable that the coating is formed of a slightly hard film having a hardness of 2H–6H in pencil hardness instead of a soft rubber-type elastic film of a hardness of B–5B in pencil hardness.

6) The above metal gaskets exhibit an excellent effect when it is used as a cylinder head gasket for sealing between the cylinder head and the cylinder block of the engine, wherein especially, the excellent sealing property is required and the flow and torque reduction are required to be prevented.

According to the above structure of the metal gasket, the coatings do not cover the top portion and the foot portions of the bead, where high surface pressures are generated when the metal gasket is tightened. Thus, the flow at that portions is suppressed.

Also, in the portion where the high sealing surface pressures are generated, the metal base plate directly abuts against the engine members to facilitate the sliding movement and prevent a large stress from being generated in the bead. Further, the wear-out resulted from the thermal expansion and contraction of the coating or vibrations, can be prevented.

Therefore, the torque reduction accompanying the flow and wear-out can be prevented.

Also, since the thicknesses of the coatings in the concave portions of the full bead and half bead are made thicker than those of the other portions, the beads can be reinforced.

BRIEF DESCRIPTION OF THE DRAWINGS

FIGS. 3(a)–3(c) are partial perspective views showing a full bead portion of a metal gasket according to other embodiments, wherein FIG. 3(a) shows a metal gasket having a two plate structure, FIG. 3(b) shows a metal gasket having a three plate structure, and FIG. 3(c) shows a metal gasket having a two plate structure with a grommet;

FIGS. 4(a) and 4(b) are partial perspective views showing a half bead portion of a metal gasket according to other embodiments, wherein FIG. 4(a) shows a metal gasket having a two plate structure, and FIG. 4(b) shows a metal gasket having a three plate structure.

DETAILED DESCRIPTION OF PREFERRED EMBODIMENTS

Next, embodiments of a metal gasket according to the present invention will be explained with reference to the accompanying drawings, referring to a cylinder head gasket to be used in an engine.

Figure 5:
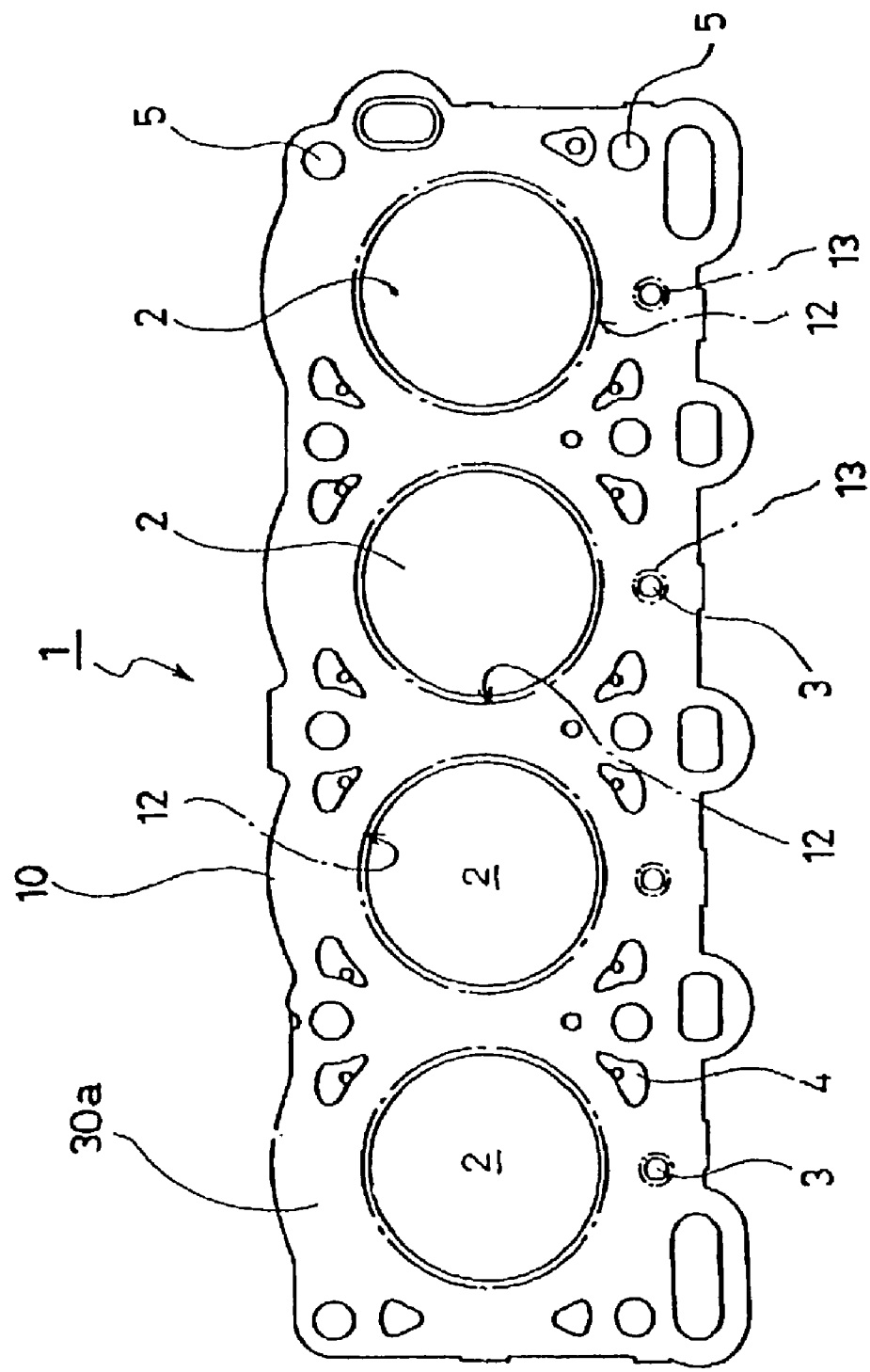
FIG. 5 is a plan view of the cylinder head gasket.

As shown in FIG. 5, a cylinder head gasket 1 according to the present invention is installed between a cylinder head and a cylinder block, i.e. a cylinder body, of an engine. The cylinder head gasket 1 seals combustion gas with a high temperature and pressure in a cylinder bore, and a fluid, such as cooling water and cooling oil, passing through a cooling water path and a cooling oil path.

Incidentally, FIGS. 1–4(b) are explanatory schematic views. A plate thickness, dimensions of a sealing groove and a length to width ratio of the cylinder head gasket are different from the actual ones for a demonstration purpose.

Figure 1:
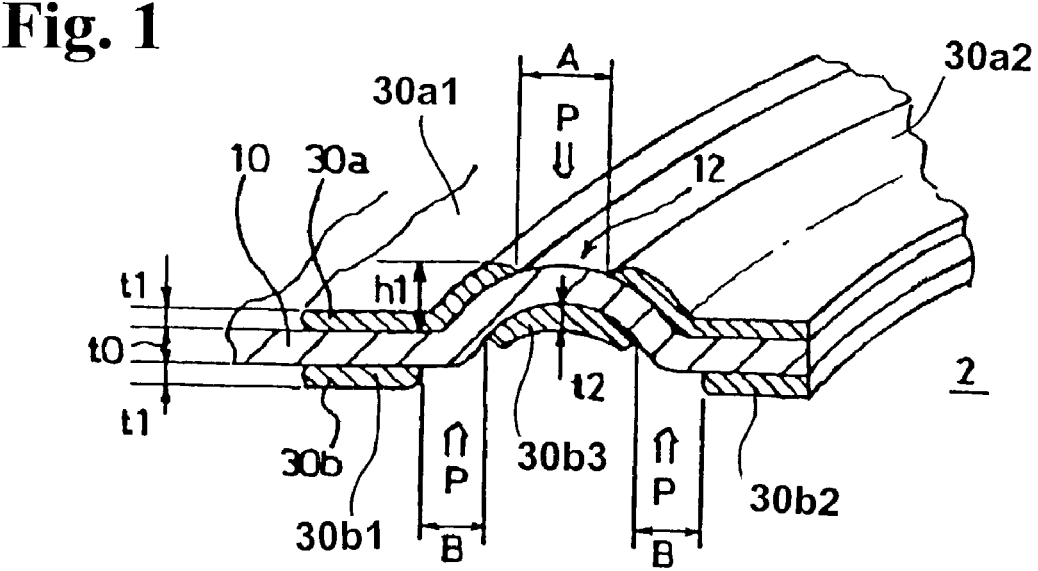
FIG. 1 is a partial perspective view showing a full bead portion of a metal gasket according to a first embodiment of the invention.

As shown in FIGS. 1 and 5, the cylinder head gasket 1 of the first embodiment according to the present invention is formed of a metal base plate 10 made of an annealed stainless steel, heat-treated stainless steel (spring steel), soft steel or the like. The metal base plate 10 is formed to fit a shape of an engine member, such as a cylinder block, and a plurality of cylinder bores 2, fluid holes 3, 4, bolt holes 5 for tightening bolts and the like are formed therein.

In the metal plate 10, sealing devices, such as a full bead 12, are provided around the cylinder bores 2 to be sealed. Another sealing devices, such as a half bead 13, are provided around the fluid holes 3 to be sealed.

Figure 2:
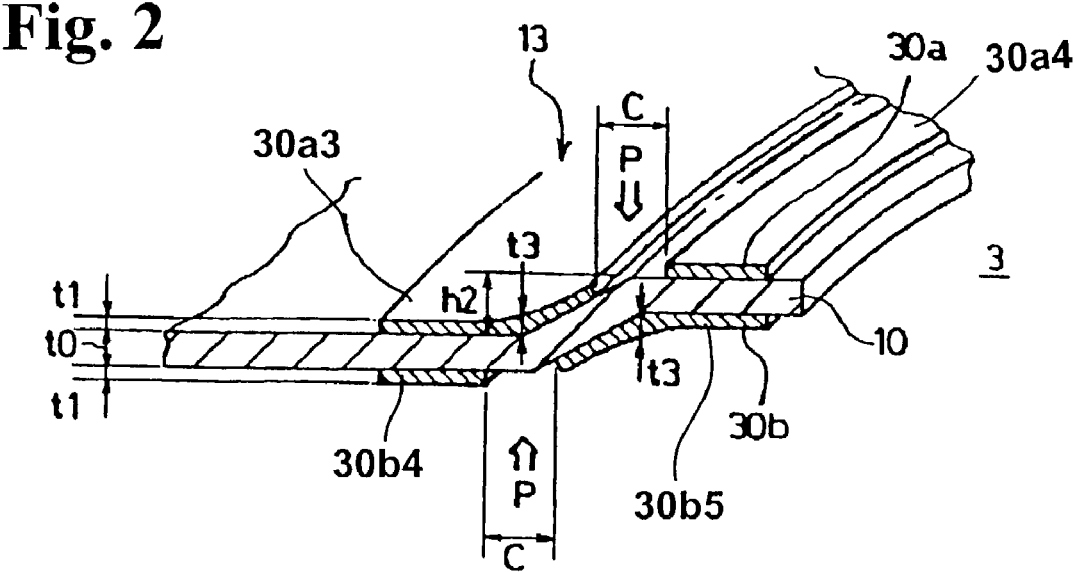
FIG. 2 is a partial perspective view showing a half bead portion thereof.

In the present invention, as shown in FIG. 1, coatings 30a (30a1, 30a2), 30b (30b1, 30b2, 30b3) are formed on both sides of the full bead 12 except for a top portion A and foot portions B, thereof. Also, as shown in FIG. 2, the coatings 30a (30a3, 30a4), 30b (30b4, 30b5) are formed on both sides of the half bead 13 except for shoulder portions C thereof.

Outer sides of the coatings 30a and 30b may be extended for a predetermined width over the foot portion B of the bead 12 and over the shoulder portion C of the bead 13. On the other hand, as shown in FIG. 1, inner sides, i.e. the sides of the cylinder bore 2, of the coatings 30a, 30b (30a2, 30b2) for the bead 12 may be extended to the edge of the cylinder bore 2. Also, as shown in FIG. 2, the inner sides, i.e. the sides of the fluid hole 3, of the coatings 30a, 30b (30a4, 30b5) for the bead 13 may be extended to the side of the fluid hole 3 but not to the edge, i.e. the middle between the inner foot portion C of the bead 13 and the edge of the fluid hole 3. In other words, the coatings 30a4, 30b4 are not applied close to the edge.

The coatings 30a, 30b are made of one or a combination of some among an epoxy resin, a phenol resin, a phenoxy resin, a fluororesin, a polyamide resin and polyamide imide. The coatings 30a, 30b are applied to the sealing surfaces, along the full bead 12 or the half bead 13, of the cylinder head gasket 1 by the screen printing to thereby obtain a slightly hard thin film with a hardness of 2H–6H in pencil hardness.

A thickness t2 of the coating 30b3 applied to the concave portion of the full bead 12 and a thickness t3 of the coatings 30a3, 30b5 applied to the concave portions of the half bead 13 are formed to be thicker than a thickness t1 of the other portions of the coatings 30a (30a1, 30a2, 30a4), 30b (30b1, 30b2, 30b4). In other words, the thicknesses t2, t3 are formed in a range from 1.1 to 3.0 (=t2/t1, t3/t1) times greater than the thicknesses of the other portions.

Regarding the dimensions of the plate and the like, for example, in case the cylinder bore has a diameter of 80 mm, the thickness t0 of the metal base plate 10 is 0.2 to 1.0 mm; the height h1 of the full bead 12 around the cylinder bore 2 is 0.05 to 0.3 mm; and the height h2 of the half bead 13 around the fluid hole 3 is 0.2 to 0.4 mm.

Regarding the thicknesses t1, t2, t3 of the coatings 30a, 30b, the thickness t1 at the other portion is 15 $\mu$m–100 $\mu$m; and the thickness t2 at the concave portion of the full bead 12 and the thickness t3 at the concave portion of the half bead 13 are 20 $\mu$m–300 $\mu$m.

According to the cylinder head gasket 1 having the structure as described above, when the cylinder head gasket 1 is tightened, relatively large surface pressures P are generated at the top portion A and the foot portions B of the full bead 12, and at the shoulder portions C, C of the half bead 13. Since the coatings 30a, 30b are formed on the other portions except for the portions A, B, and C, the flow and wear-out of the coatings 30a, 30b can be prevented, which results in suppression of the torque reduction.

Next, with reference to FIGS. 3(a) through 4(b), other embodiments will be explained.

Figure 3A:
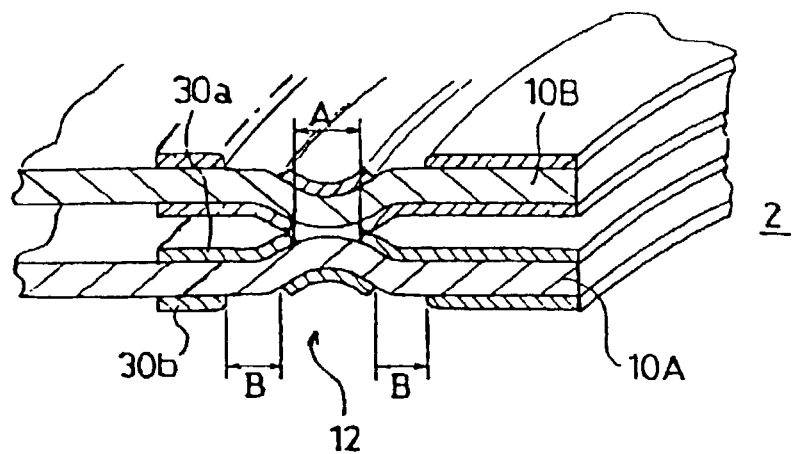
Figure 3B:
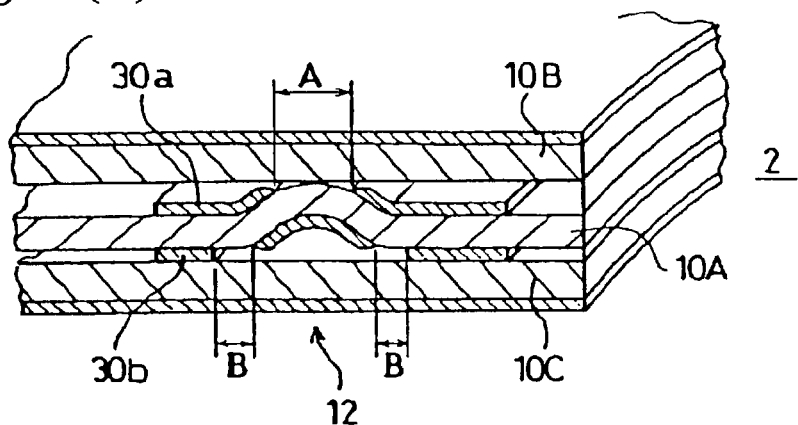
Figure 3C:
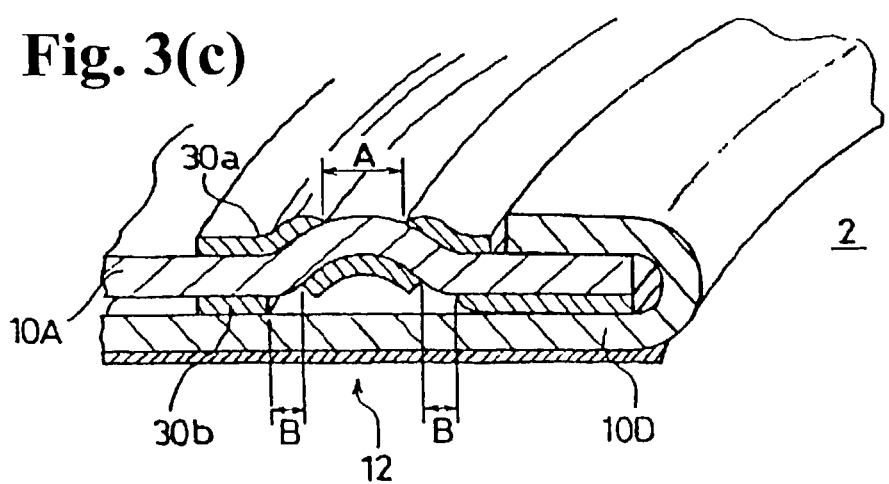

FIGS. 3(a) through 3(c) show a portion of full beads 12 provided on a metal gasket formed of a plurality of metal base plates, respectively. The coatings 30a, 30b are applied on both sides of the full bead 12 except for the top portion A and the foot portions B.

FIG. 3(a) shows an example of a metal gasket with a two plate structure having plates 10A, 10B; FIG. 3(b) shows an example of a metal gasket with a three plate structure having plates 10A, 10B, 10C; and FIG. 3(c) shows a gasket structure having a plate 10A and a plate 10B with a grommet, i.e. curved portion and a flange. The plates 10A, 10B are generally the same as the plate 10 shown in FIG. 1.

Figure 4A:
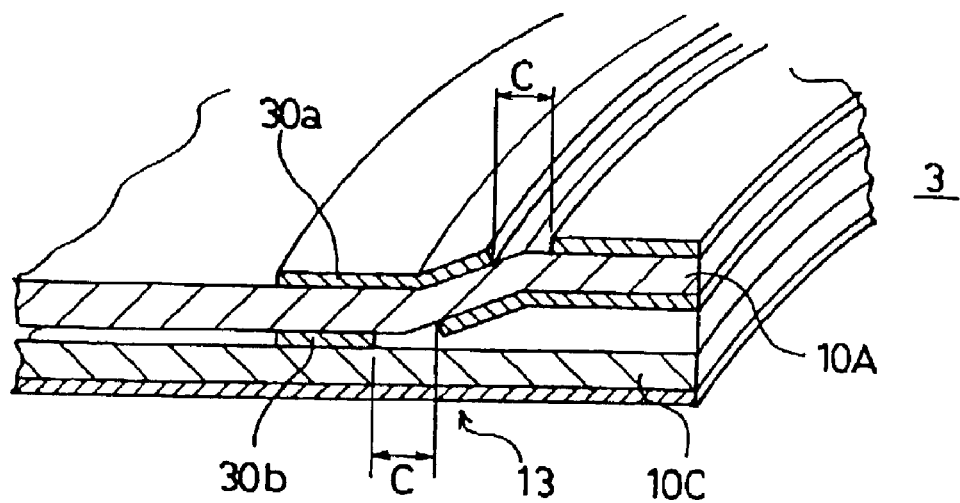
Figure 4B:
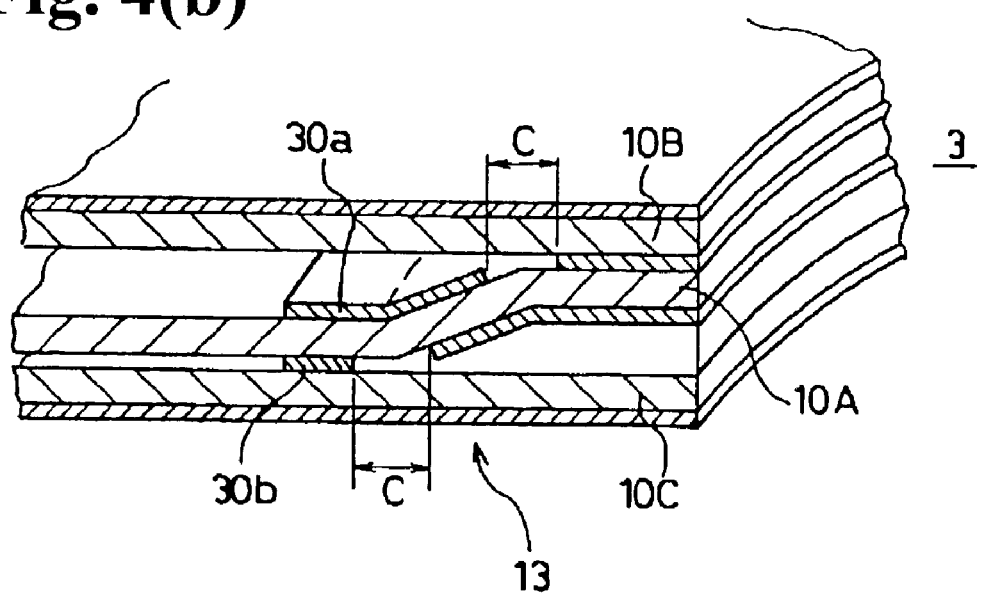

FIGS. 4(a) and 4(b) show a portion of a half bead 13 of a metal gasket formed of a plurality of metal base plates, respectively. In the gaskets, the coatings 30a, 30b are formed on both sides of the half bead 13 except for the shoulder portions C, respectively.

FIG. 4(a) shows an example of the metal gasket with a two plate structure having plates 10A, 10C; and FIG. 4(b) shows an example of the metal gasket with a three plate structure having plates 10A, 10B, 10C. The plates 10A in FIGS. 4(a) and 4(b) are generally the same as the plate 10 shown in FIG. 2.

According to the metal gasket of the invention, when the metal gasket is tightened, sealing line portions for locally generating strong sealing surface pressures are formed around the beads, i.e. the top portion and foot portions of the full bead or the shoulder portions of the half bead, of the metal base plate of the metal gasket. In the present invention, the coatings are not provided on the sealing line portions, so that the flow and wear-out of the coatings on the sealing line portions can be prevented, which leads to no torque reduction.

Also, the portions of the metal base plate where the high sealing surface pressures are generated, directly abut against the engine members to thereby facilitate a sliding movement of the gasket therebetween and prevent generation of a large stress in the bead. Also, the flow and the wear-out of the coating by repeated thermal expansion and contraction are prevented. Since the flow and the wear-out can be prevented, the torque reduction accompanying the flow can also be suppressed.

Further, since the coatings of the concave portions of the full bead and the half bead are formed thicker than the other portions, the bead can be reinformed. Thus, the metal gasket having a good sealing property and durability can be obtained.

While the invention has been explained with reference to the specific embodiments of the invention, the explanation is illustrative and the invention is limited only by the appended claims.

What is claimed is:

1. A metal gasket for sealing two members, comprising:
   a first metal plate having a base portion, a hole to be sealed, and a half bead formed around the hole, said half bead having upper and lower shoulder portions providing seal line portions forming sealing surface pressures greater than those of other portions when the first metal plate is tightened, each shoulder portion having a projection with an outer surface and a dent at a side opposite to the projection, and a middle portion between the upper and lower shoulder portions, and
   seal coatings formed on and around the half bead and having upper coating sections formed on an upper side of the first metal plate and spaced apart from each other at the outer surface of the upper shoulder portion, and lower coating sections formed on a lower side of the first metal plate and spaced apart from each other at the outer surface of the lower shoulder portion so that the outer surfaces of the upper and lower shoulder portions do not have the coatings while the middle portion and the dents of the upper and lower shoulder portions have coatings for reinforcement,
   wherein a part of the upper coating section deposited in the dent has a thickness greater than thicknesses of the upper coating sections not deposited in the dent, a part of the lower coating section deposited in the dent has a thickness greater than thicknesses of the lower coating sections not deposited in the dent, and the upper and lower coating sections are partially overlapped at the middle portion.

2. A metal gasket according to claim 1, further comprising at least one second metal plate laminated on the first metal plate.

* * * * *